United States Patent [19]
Wilkins

[11] Patent Number: 5,699,752
[45] Date of Patent: Dec. 23, 1997

[54] GELATIN-PLASTIC FOAM BIRD FEEDING STATION AND PROCESS

[76] Inventor: Judd R. Wilkins, 281 Littletown Quarter, Williamsburg, Va. 23185

[21] Appl. No.: 755,485

[22] Filed: Nov. 22, 1996

[51] Int. Cl.⁶ ............................................. A01K 39/01
[52] U.S. Cl. ..................... 119/51.03; 119/57.8; 426/1
[58] Field of Search ...................... 119/51.03, 52.3, 119/57.8, 57.9; 426/1

[56] References Cited

U.S. PATENT DOCUMENTS

| | | | |
|---|---|---|---|
| 2,987,041 | 6/1961 | Bard | 119/52.3 |
| 3,607,295 | 9/1971 | Morgan | 426/1 |
| 4,413,014 | 11/1983 | Melancon | 426/1 |
| 4,632,061 | 12/1986 | Tucker et al. | 119/57.8 |
| 5,086,730 | 2/1992 | Figley | 119/57.9 X |
| 5,107,796 | 4/1992 | Emrey | 119/57.8 X |
| 5,174,581 | 12/1992 | Goodson | 119/51.03 X |
| 5,191,857 | 3/1993 | Boaz | 119/52.3 |
| 5,546,696 | 8/1996 | Parker, Jr. | 426/1 X |
| 5,606,933 | 3/1997 | Wilkins | 119/51.03 |

*Primary Examiner*—Robert P. Swiatek
*Assistant Examiner*—Elizabeth Shaw
*Attorney, Agent, or Firm*—Wallace J. Nelson

[57] ABSTRACT

A bird feeder station including a clear plastic canopy provided with a hanging line for suspension thereof from an overhead structure and three depending chain supports for wire baskets containing bird seed suspended under the protection of the canopy. Each wire basket contains a porous plastic foam core saturated with a gelatin and multiple bird seed embedded within at least one gelatin surface coating on the plastic core. The process involves placing the plastic core in an open mold, spooning a quantity of hot gelatin containing multiple bird seed over the exposed surface of the plastic, refrigerating the gelatin coated plastic core to solidify the gelatin-bird seed coating thereon; turning the plastic over to expose a different side and repeating the spooning of the hot gelatin and refrigeration thereof for all sides and top (if desired) of the plastic core.

19 Claims, 4 Drawing Sheets

GELATIN-PLASTIC FOAM BIRD FEEDING STATION AND PROCESS

FIELD OF THE INVENTION

This invention relates to bird feeders in general and relates specifically to a bird feeding station including one or more porous plastic cores saturated with gelatin, and each containing at least one exterior surface of gelatin embedded bird seed, and the process of making same.

BACKGROUND OF THE INVENTION

Bird feeders can generally be divided into three groups. The most common type is a platform and a wide variety of designs are available in this group, with the simplest form being a square or rectangular piece of wood, or plastic, mounted on a pole or attached to a tree, house, or other structure. Other platform feeders have a roof with an inside sheet of glass or plastic in which seeds of various types are gravity fed to the platform floor. Plastic feeders range in shape from a tube with a series of holes and perches, to a circular form with a hood and a receptacle for holding feed.

Suet feeders consist of rendered beef fat to which bird seed and raisins are added before the suet is allowed to solidify. The usual suet shape is a 4×4×1 inch block placed in a wire mesh cage or net bag. Suet feeders are also available in a bell shape.

Hummingbird feeders concentrate on providing a heavily sugared liquid, usually red in color. These feeders consist primarily of a glass or plastic container outfitted with one or more bent protuberances or snouts to accommodate the beak of the hummingbirds.

Applicant's copending application, Ser. No. 08/394,245, filed Feb. 24, 1995, for "Agar-Plastic Foam Bird Feeder and Process" describes a method for making bird feeders using agar and plastic foam. The present invention is an extension of this application which is incorporated herein by reference.

It is an object of the present invention to provide a unique bird feeder that is easy to construct, simple to maintain, and economic to use.

Another object of the present invention is to employ a bird feeder that combines the unique qualities of gelatin and porous plastic foam in its construction and use, and involves a simplified process of constructing a durable low cost bird feeder.

A still further object of the present invention is an ornamental bird feeder that is resistant to invasion by squirrels or other predators.

An additional object of the present is a process of making an economical bird feeder that combines some of the advantages of prior art bird feeders while minimizing some of the disadvantages thereof.

SUMMARY OF THE INVENTION

According to the present invention, the foregoing and additional objects are attained by providing a bird feeder adapted to be suspended from an overhead support including a substantially funnel shaped canopy provided with a tubular protuberance terminating at the small opening at one thereof. Spaced washers are secured at the ends of the protuberance with a first attachment structure leading from the first washer and extending exteriorly from one end of the protuberance and a second attachment structure leading from the other end of the protuberance and extending interiorly within the funnel shaped canopy. The first attachment structure serves to support the bird feeder from an overhead support, while the second attachment structure serves to releasably secure a chain connected span bar. At least one bird seed container is releasably secured to the span bar and maintained beneath the canopy for protection from the elements and squirrels. The bird seed container(s) include a wire basket containing a porous foam plastic core saturated with gelatin and having a layer of bird seed embedded in the gelatin on at least a portion of the exterior surface of the plastic core. The span bar is formed of three wood dowels each provided with a connecting hook at each end thereof. The end hooks of the dowels are interconnected to form a triangular configured span bar. Three equal lengths of chain extend from the second attachment structure to the ends of the dowels to provide horizontal support for the span bar. In the preferred embodiment of the invention three wire baskets, each containing a porous foam plastic core carrying the bird seed embedded gelatin surface(s), are connected to the triangular span bar at the wood dowels ends.

In forming the bird seed embedded gelatin surface(s) on the porous foam plastic core, an open mold is provided and the plastic core positioned therein. A hot solution of gelatin is poured over the plastic core in the mold and a plurality of bird seed are manually added to the hot liquid gelatin layer formed on the exposed surface of the plastic core. After refrigeration, the gelatin solidifies and the gelatin coated plastic core is removed from the mold. If desired, the plastic foam is inverted within the mold and an addition layer of bird seed/gelatin is added to the opposite side of the plastic core.

Layers of gelatin embedded bird seed may also be applied to the top and sides of the plastic core by the same process. The coated plastic core is positioned within a wire frame basket and attached to the span bar of the bird feeder by a support wire previously embedded within the plastic core. Also, when desired, a suitable food coloring may be added to the hot liquid gelatin for aesthetic purposes, or to attract specific birds.

In an alternate process, the bird seed is added to the hot gelatin solution and this slurry is spooned over the porous plastic foam core within the mold cavity. The refrigeration for solidification of the gelatin is the same, as is the positioning of the seed coated plastic core within the wire frame baskets.

BRIEF DESCRIPTION OF THE DRAWINGS

A more complete appreciation of the invention and many of the attendant advantages thereof will be more readily apparent as the same becomes better understood in reference to the accompanying drawings wherein.

DETAILED DESCRIPTION

Figure 1:
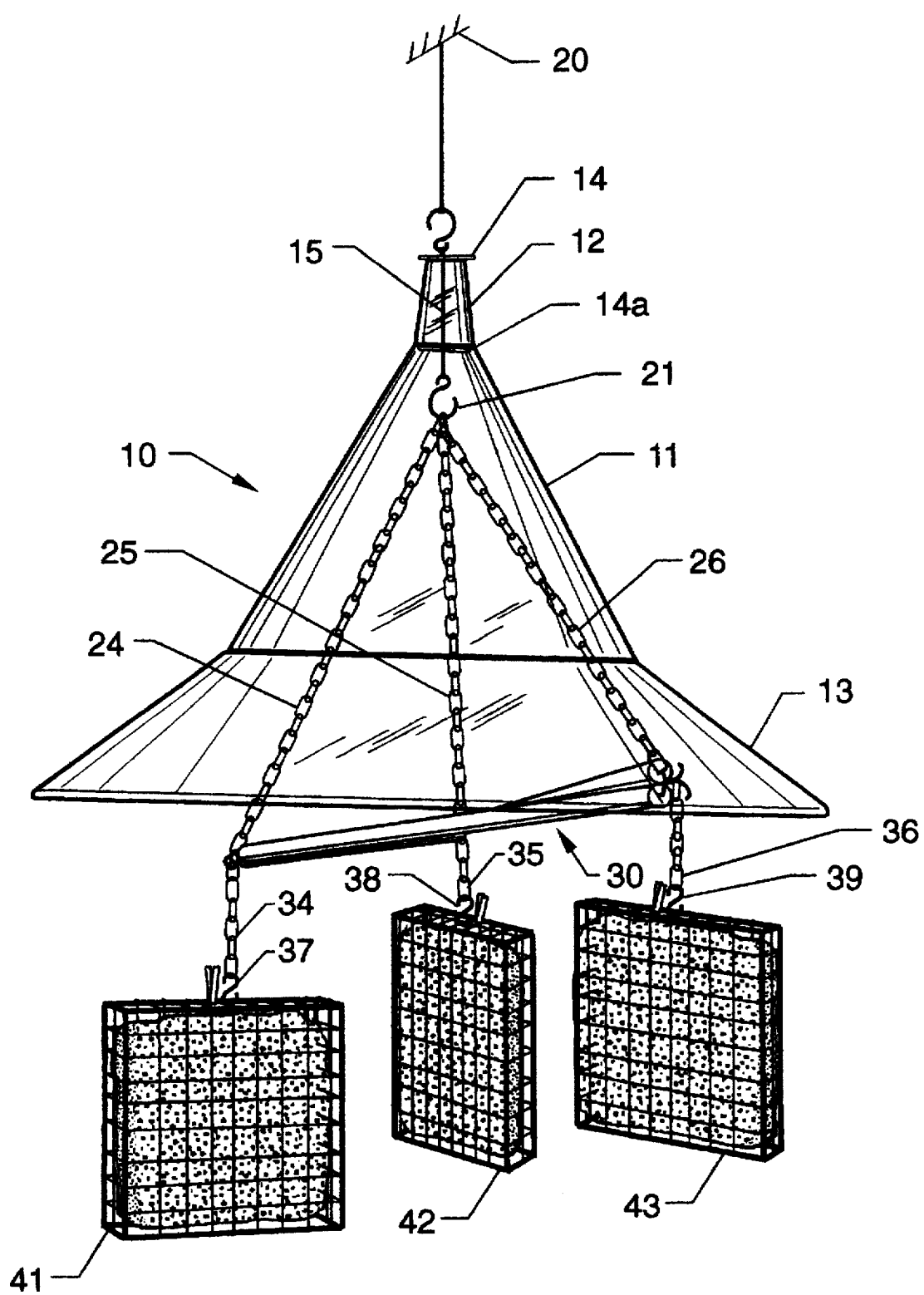
FIG. 1 is a schematic view of the bird feeder station of the present invention suspended from a fixed structure.

Referring now to the drawings, and more particularly to FIG. 1, an exemplary bird feeder station, according to the present invention is shown and designated generally by reference numeral 10. As shown therein, bird feeder station 10 includes a substantially funnel shaped canopy 11 having an integral tapered tubular protuberance 12 at the small end thereof and an integral frusto-conical baffle 13 extending from the large end thereof.

In the preferred embodiment, canopy 11 and its integral parts, protuberance 12 and baffle 13, are formed of a clear heavy duty plastic, such as that manufactured by Arundale Products, Inc. (Model AR154) and available from Wild Birds Unlimited, and other bird feed stores. The canopy employed in a specific embodiment of the present invention has a 17 inch diameter base, a 12 inch height and the apex protuberance 2 and ¾ inches long with a one inch neck diameter and provided with a ¼ inch diameter opening. A first metal washer 14 is cemented in place over the exterior opening of protuberance 12 and a second metal washer 14a is cemented inside of canopy 11 at the neck of protuberance 12. A length of heavy duty wire 15 (a five inch segment of 14 gauge wire, in the preferred embodiment), is extended through the length of protuberance 12. A first attachment structure, hook 17, is connected to one end of wire 15 adjacent, and extending exteriorly from, first washer 14. A length of suitable line 19, such as a heavy duty wire, rope or length of chain, connects first hook 17 to a suitable support structure, designated by reference numeral 20.

A second attachment structure, hook 21, is also connected to wire 15 and extends from washer 14a interiorly of canopy 11. Three separate lengths of metal chain, designated by reference numerals 24, 25 and 26, are releasably attached to hook 21. In the preferred embodiment, chains 24, 25 and 26 are ten inch lengths of "Jalk 250" chain. Chain lengths 24, 25 and 26 each terminate and connect with a corner of a triangular span bar assembly, designated by reference numeral 30, as will be further described hereinbelow.

Three separate lengths of chain 34, 35 and 36 also connect with the corners of span bar 30 and support, via respective "S" hooks 37, 38 and 39. The "S" hooks 37, 38 and 39 serve to attach respective wire baskets 41, 42 and 43 to respective chains 34, 45 and 36. In the preferred embodiment, wire baskets 41, 42 and 43 measure 4½ by 4½ by 1¾ inches and are provided with grid openings of ⅜ by ⅜ inch square.

Figure 3:
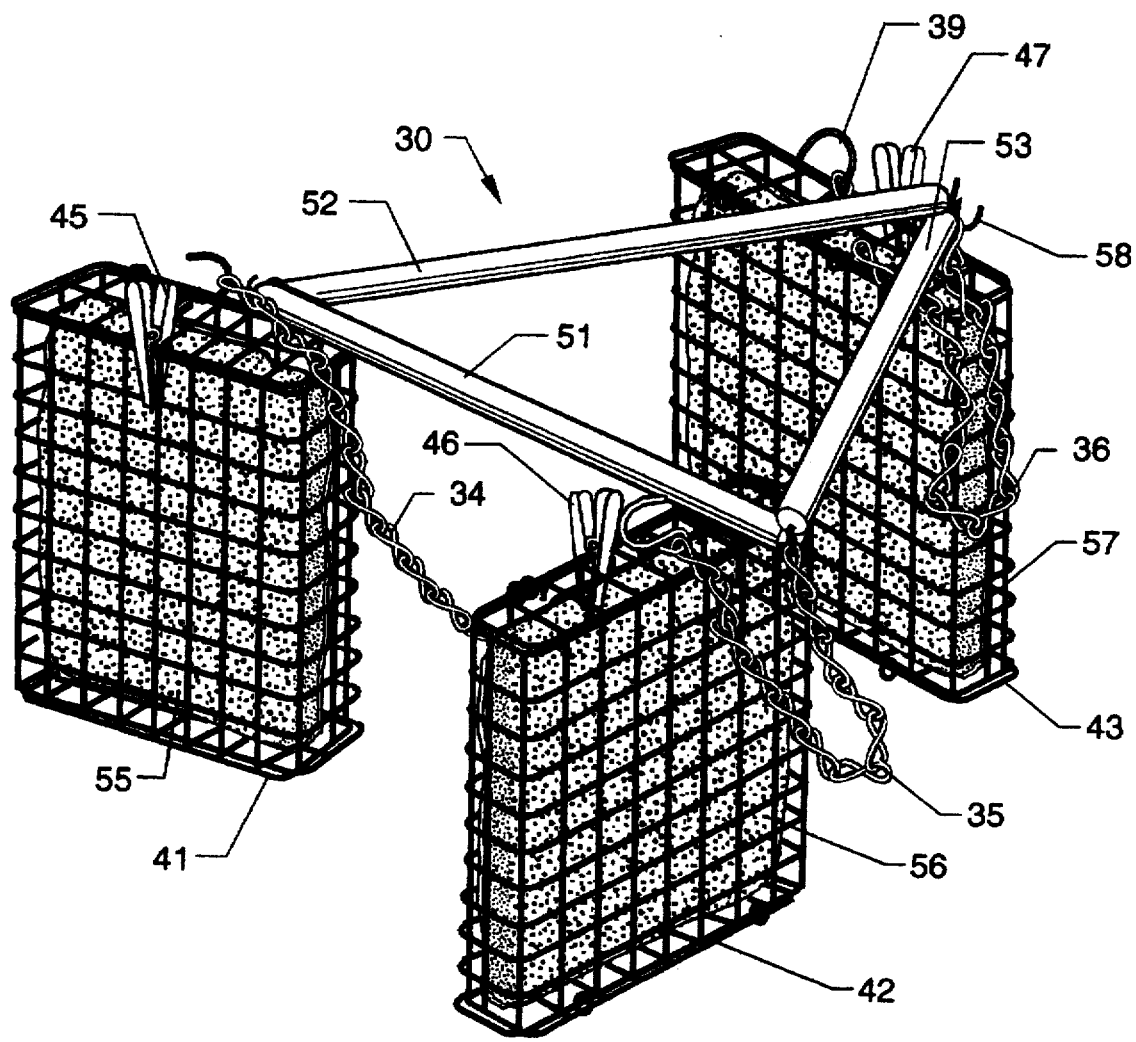
FIG. 3 is a schematic view of a portion of the bird feeder station shown in FIG. 1 with the bird seed/gelatin/plastic foam in place; and, FIG. 4 is a schematic view of the materials employed in the process of the present invention.

Each basket 41, 42 and 43 is provided with an operable lid (not designated) that is held in closed position by an alligator clip, as shown more clearly in FIG. 3. The alligator clips for baskets 41, 42 and 43 are designated, respectively, by reference numerals 45, 46 and 47.

Figure 2:
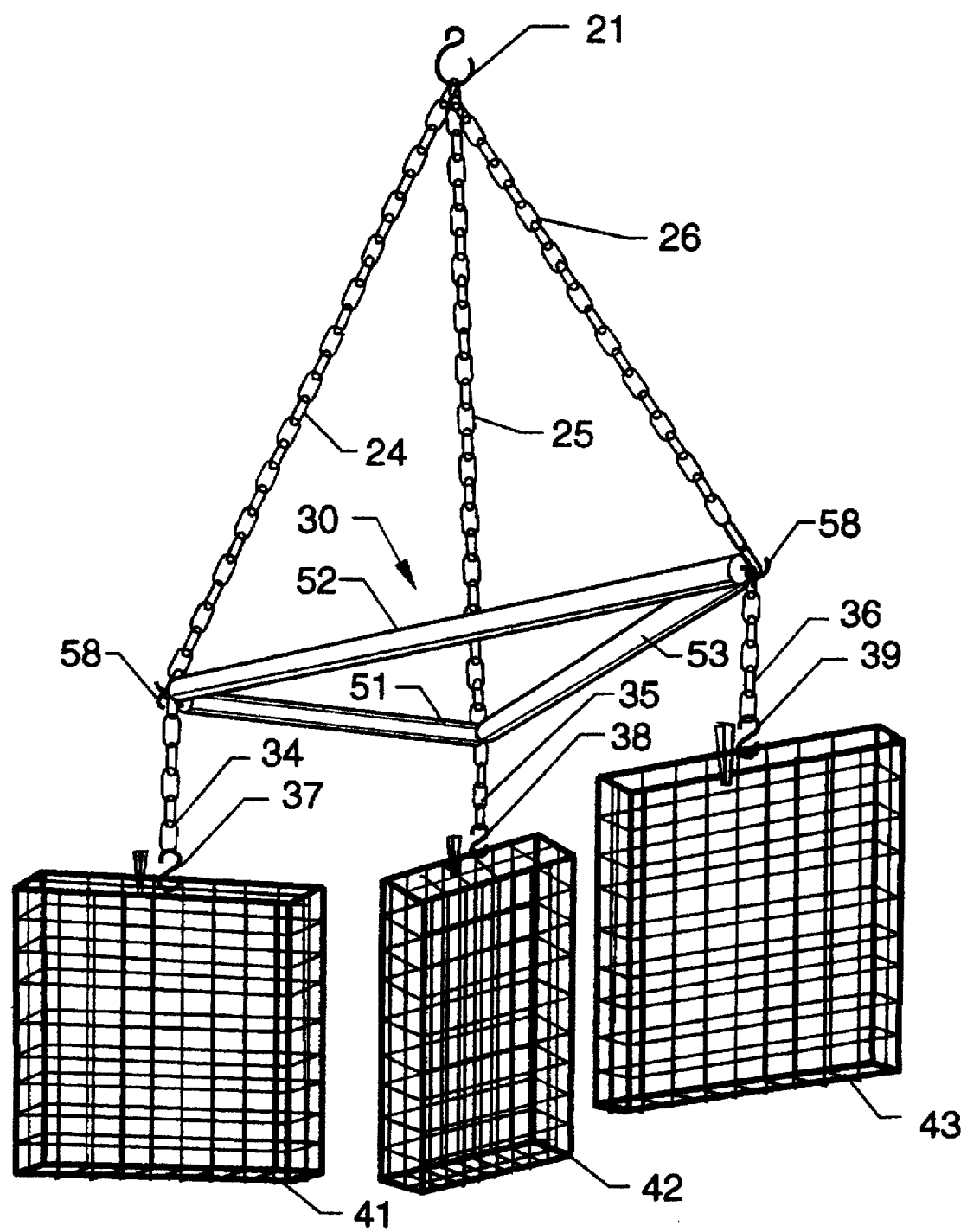
FIG. 2 is a schematic view of a portion of the bird feeder station shown in FIG. 1 prior to insertion of the gelatin supported bird seeds therein.

Referring now more particularly to FIGS. 2 and 3, the details of span bar assembly 30 will now be described. In the preferred embodiment, span bar assembly 30 is constructed from three wooden dowels (½ inch diameter and eight inches in length) as designated by reference numerals 51, 52 and 53. Each dowel is provided with a conventional cup hook at each end thereof with those visible in the drawings being designated by reference numeral 58. Hooks 58 on the terminal ends of each dowel serve to attach the dowels to each other and to the terminal ends of chain lengths 24, 25 and 26 to form horizontally disposed triangular span bar assembly 30. More particularly, the hooks 58 on one end of dowels 51 and 52 connect with each other and with chain length 24; a hook on the other end of dowel 51 and a hook on one end of dowel 53 connect to each other and with chain length 25; while the remaining hooks on dowels 52 and 53 connect with each other and with chain length 26. Wire baskets 41, 42 and 43 attach to the hooks 58 at the corners of span bar assembly 30 via respective "S" hooks 37, 38 and 39 and respective chain length segments 34, 35 and 36.

FIG. 2 illustrates the wire baskets 41, 42 and 43 when empty, while FIG. 3 illustrates wire baskets 41, 42 and 43 containing respective bird seed impregnated gelatin coating on porous plastic foam cores as designated, respectively, by reference numerals 55, 56 and 57, and prepared according to the present invention.

Figure 4:
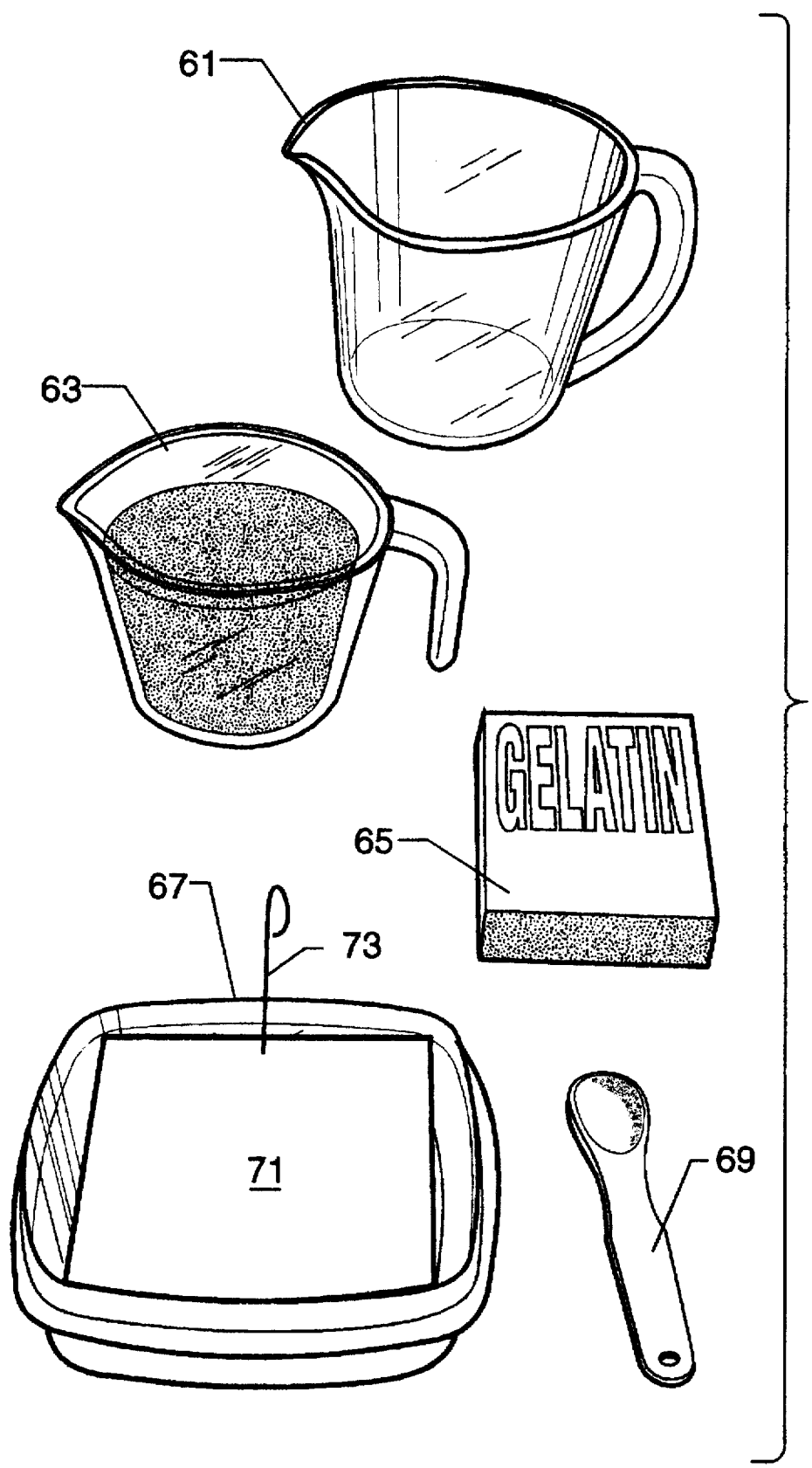

Referring now more particularly to FIG. 4, the details of preparing the bird seed impregnated gelatin coating on the porous plastic foam cores will now be described. As shown therein, a two cup measuring cup 61, a container of bird seed 63, a box of gelatin 65, an open essentially square mold 67, and a measuring spoon 69 are employed in the process. A porous plastic foam core 71 is placed within mold 67. A wire loop 73 is attached to one end of the square plastic foam to assist in placing and removing the foam material within mold 67. In the preferred embodiment, mold 67 is a Rubbermaid sandwich sized box available from grocery or hardware stores, porous plastic foam core 71 is cut into essentially four inch squares from 0.5 to 1.5 inch thick porous plastic polystyrene foam (available from Piece Goods stores) and wire loop 73 is formed of eighteen gauge copper wire.

In preparation, the square porous plastic foam 71 was placed in mold 67 using wire loop support 73. Four ounces of water was added to the two cup measuring cup 61, followed by one teaspoon of gelatin (Knox gelatin available from grocery stores) and four ounces of bird seed from container 63 added to the water gelatin mixture. Measuring cup 71 and its mixture contents was then placed in a microwave oven at the high setting for three minutes. At two minutes, or when the mixture began to boil, it was stirred and allowed to boil for the remaining minute. Boiling of the seed-gelatin-water mixture serves to inhibit mold growth if the feeders are held in storage. When employing a neutral gelatin, suitable food or cake coloring (for example, Durkee) may be added to the hot mixture at this point to achieve the desired color for aesthetic purposes or to attract a particular species of birds. The hot seed slurry was then spooned evenly over the exposed side of porous plastic foam square 71. The hot gelatin mixture saturates the porous plastic foam leaving a layer coating of gelatin and bird seed on the exposed surface of the plastic foam. The seed coated square is then placed in a refrigerator freezer compartment for ten minutes, or at the lower temperature compartment of the refrigerator for one hour, or until the gelatin solidifies. After refrigeration, the seed coated squares are turned over and the heated seed mixture spooning process repeated. The seed coated squares were allowed to dry at room temperature for 24 hours. If desired, the top (with the attached wire loop) and the side portions of the plastic square cores can be coated with bird seed using the same procedure as described for coating the other surfaces. The seed coated squares were then placed in the three wire baskets 41, 42 and 43 and the bird feeder station 10 deployed for use using line 19 (which may also be a chain length) to connect hook 17 to a suitable overhead support 20 (a tree limb or other fixed support).

In an alternate process, the hot gelatin solution is poured directly onto the exposed surface of plastic core 71 within mold 67 and the bird seed spooned onto the resulting hot gelatin coating. The force of gravity causes the seeds to penetrate into the liquid gelatin where they are retained when the gelatin solidifies upon refrigeration of the coated plastic core.

Although the invention has been described relative to specific embodiments thereof, it is not so limited, and there are numerous variations and modifications thereof that will be readily apparent to those skilled in the art in the light of the above teachings. The specific embodiments described herein are to be considered as exemplary and are not to be deemed as exhaustive.

It is to be understood that where specific measurements and materials are given for the components of the present invention, that these are given by way of example to illustrate the principal of the invention and are not to be deemed as limitations thereof.

Any materials suitable for the construction of the bird feeder station described hereinabove are considered within the scope of the invention. For example, although baskets 41, 42 and 43 in the preferred embodiments described herein are wire baskets, these components could be formed of a suitable and durable plastic material without departing from the scope of the invention. Accordingly, the specific embodiments described herein are to be considered as exemplary and are not to be deemed as exhaustive.

It is therefore to be understood that, within the scope of the appended claims, the invention may be practiced other than as specifically described herein.

What is claimed as new and desired to be secured by Letters Patent of the United States is:

1. A bird feeder adapted to be suspended from an overhead support comprising:
   a substantially funnel shaped canopy having a tubular protuberance terminating at a small opening at one end thereof;
   a first washer means sealed to a first end of said tubular protuberance of said canopy;
   a second washer means spaced from said first washer means and sealed to a second end of said tubular protuberance of said canopy;
   support means extending the length of said tubular protuberance of said canopy and through said first and said second washer means;
   said support means including
   (1) a first attachment structure leading from said first washer and extending exteriorly from said first end of said tubular protuberance of said canopy and,
   (2) a second attachment structure leading from said second washer and extending interiorly within said funnel shaped canopy; and,
   means releasably secured to said second attachment structure for supporting at least one container of bird seed.

2. The bird feeder of claim 1 wherein said at least one container of bird seed comprises at least one wire basket; said wire basket containing a porous plastic foam core; a gelatin coating on said plastic foam core; and, multiple bird seed embedded within said gelatin coating.

3. The bird feeder of claim 1 wherein said means releasably secured to said second attachment structure for supporting at least one container of bird seed comprises;
   three equal length chain segments having a first end releasably secured to said second attachment structure;
   each of said three equal length chain segments having a second end releasably secured to a span bar;
   said span bar including three dowel rods;
   each of said dowel rods being provided with a hook connector at each end thereof;
   said dowel rods being releasably connected to each other by interconnection of said hook connectors to form a triangular configured span bar; and
   said end of said three equal length chain segments being releasable secured to the hook connectors between the ends of said dowel rods forming said span bar.

4. The bird feeder of claim 3 wherein said at least one container of bird seed comprises three wire baskets; each of said three wire baskets being releasably connected to said hook connectors between the ends of said dowel rods forming said span bar; and each of said three wire baskets containing a porous plastic foam core; said porous plastic foam core being saturated with a gelatin to provide a solidified gelatin coating thereon and, a plurality of bird seed embedded within said solidified gelatin coating.

5. The bird feeder of claim 3 including a frusto-conical baffle integral with and extending from the enlarged open end of said substantially funnel shaped canopy; said span bar defining a circumference that is confined within the circumference of said frusto-conical baffle to thereby provide some protection of the wire baskets of bird seed from predators and the elements.

6. The bird feeder of claim 3 wherein each said porous foam plastic core is formed from a plastic polystyrene foam having a thickness in the range of 0.5 to 1.5 inches.

7. The bird feeder of claim 4 wherein said solidified gelatin coating is disposed completely over said front, said back and said side surface areas of said porous foam plastic core, and wherein said bird seed retained in said solidified gelatin coating covers at least said front and said back exterior surface areas of said porous foam plastic core.

8. The bird feeder of claim 1 wherein said solidified gelatin coating surface completely covers said front, said back and said side surface areas of said porous foam plastic disk and, wherein said quantity of bird seed retained therein covers at least said front and said back surface areas of said porous foam plastic core.

9. A method of making a hanging bird feeder comprising the steps of:
   (a) providing an open mold having a cavity in the shape of that desired for a bird feeder;
   (b) mixing a one part, by weight, of gelatin with four parts, by weight, of water;
   (c) adding four parts, by weight, of bird seed to this mixture with stirring;
   (d) heating the combined mixture to boiling temperature;
   (e) stirring the hot mixture;
   (f) boiling the stirred mixture for at least one additional minute to provide a hot seed slurry;
   (g) providing a foam plastic core having a suspension wire embedded therein and extending from one end thereof;
   (h) placing this plastic core in an open mold;
   (i) spooning the hot seed slurry evenly over the top exposed side of the foam plastic core;
   (j) refrigerating the mold and contents until the gelatin is gelled to provide a solidified gel coating on the top surface of the foam plastic core;
   (k) turning the top coated foam plastic core over and repeating steps (l) and (j); and,
   (l) drying the gel coated foam plastic core for approximately 24 hours at room temperature to recover a bird feeder that may be suspended from any suitable support.

10. The method of making a hanging bird feeder as in claim 9 including the step of positioning the recovered bird feeder in a wire retention basket and suspending the wire retention basket from a suitable support structure.

11. The method of making a hanging bird feeder as in claim 10 including the steps of providing a protective canopy for a bird feeder; providing a span bar disposed within the protective canopy; and wherein the wire retention basket is suspended from the span bar.

12. The method of claim 11 including providing the span bar with a triangular configuration formed of three dowel rods having interconnected ends; suspending the triangular span bar via three separate chain supports disposed within the interior of the protective canopy, and including the step of placing three wire basket supported bird feeders at the interconnected ends of the span bar.

13. A method of making a hanging bird feeder comprising the steps of:
 (a) providing a substantially funnel shaped canopy having a tubular protuberance terminating at a small opening at a first end thereof and having a frusto-conical baffle integral with and extending from an enlarged second open end thereof;
 (b) securing a first washer sealed to a first end of the tubular protuberance;
 (c) securing a second washer spaced from the first washer and secured to a second end of the tubular protuberance;
 (d) providing a first attachment structure leading from the first washer and extending exteriorly from the first end of the tubular protuberance;
 (e) providing a second attachment structure leading the second washer and extending interiorly within the funnel shaped canopy; and
 (f) releasably securing at least one elongated line to the second attachment structure for supporting at least one container of bird seed.

14. The method of claim 13 wherein the at least one elongated line comprises three equal length chain segments and including the steps of providing a triangular configured span bar attached to the three equal length chain segments for supporting the at least one container of bird seed.

15. The method of claim 14 including providing three equal lengths of dowel rods; connecting the ends of the three equal lengths of dowel rods to each other to form the triangular configured span bar; securing a container of bird seed to at least one of each of the three equal lengths of dowel rods.

16. The method of claim 14 including the steps of providing a porous plastic foam core disposed within an open mold so as to leave a visible exposed surface of the foam core; saturating the porous plastic foam core with a hot liquid gelatin to provide a layer of hot gelatin on the visible exposed surface of the foam core; applying a quantity of bird seed to the hot layer of gelatin; refrigerating the mold and porous plastic foam core contents to cause the gelatin within the porous plastic foam core and the exposed layer thereof to solidify and thereby create a layer of bird seed embedded within the gelatin layer; removing the porous plastic foam core from the mold and inserting it into a wire basket to form the at least one container of bird seed; and, suspending the at least one container of bird seed to the triangular span bar.

17. The method of claim 16 wherein, after refrigeration, the porous plastic foam core having the layer of bird seed thereon is removed from the open and turned over to position the layer of bird seed embedded within the gelatin layer on the bottom of the open mold and leave an exposed surface of the porous plastic foam core; covering this exposed surface of the porous plastic foam core with a quantity of hot liquid gelatin and, while hot, adding a quantity of bird seed to this layer of gelatin; again refrigerating the mold and its contents to solidify this second layer of gelatin containing bird seed.

18. The method of making a hanging bird feeder as in claim 16 wherein the hot liquid gelatin has a neutral color and including the step of adding a small quantity of a food color to the hot liquid gelatin solution to tailor the color of the recovered bird seed container.

19. The method of claim 16 including the step of adding additional bird seed to the top and side portions of the porous foam plastic core by again applying hot liquid gelatin thereto and adding bird seed to the hot liquid gelatin.

* * * * *